BIPOLAR MAGNETIC RECORDER

Original Filed Nov. 18, 1947 5 Sheets-Sheet 1

INVENTOR
ROBERT I. ROTH
BY Robert S. Dunham
ATTORNEY

Dec. 7, 1954 R. I. ROTH 2,696,420

BIPOLAR MAGNETIC RECORDER

Original Filed Nov. 18, 1947 5 Sheets-Sheet 2

INVENTOR
ROBERT I. ROTH
BY Robert S. Dunham
ATTORNEY

INVENTOR
ROBERT I. ROTH
BY Robert S. Dunham
ATTORNEY

Dec. 7, 1954 R. I. ROTH 2,696,420

BIPOLAR MAGNETIC RECORDER

Original Filed Nov. 18, 1947 5 Sheets-Sheet 4

INVENTOR
ROBERT I. ROTH
BY Robert S. Dunham
ATTORNEY

Dec. 7, 1954 R. I. ROTH 2,696,420

BIPOLAR MAGNETIC RECORDER

Original Filed Nov. 18, 1947 5 Sheets-Sheet 5

INVENTOR
ROBERT I. ROTH
BY Robert S. Dunham
ATTORNEY

United States Patent Office 2,696,420

Patented Dec. 7, 1954

2,696,420

BIPOLAR MAGNETIC RECORDER

Robert I. Roth, Mount Pleasant, N. Y., assignor to International Business Machines Corporation, New York, N. Y., a corporation of New York Continuation of application Serial No. 786,746, November 18, 1947. This application December 14, 1950, Serial No. 200,777

3 Claims. (Cl. 346—74)

This invention pertains to the making of sheet records of the magnetic spot type disclosed in my Patent No. 2,436,829, issued March 2, 1948 of which this application is a continuation-in-part, and constitutes a continuation of Robert I. Roth application, Serial No. 786,746, filed November 18, 1947.

An object of the invention is to make a magnetic spot record in which the spots will produce a stronger signal than has previously been obtained.

Another object is to make a control record having magnetic spots capable of producing distinctly different responses in a sensing device depending upon novel differentiating characteristics of the spot.

Another object is to make a control record on which positive and negative amounts are distinguished by the nature of the individual spots.

Another object is to make a control record on which data are represented by significantly located magnetic spots having further distinguishing characteristics indicating the class of the data.

Another object is to make a control record having magnetic spots representing data in accordance with a code wherein the variables include, in addition to the position of the spots, certain differentiating characteristics of the individual spots.

Another object is to make a record with bipolar magnetic spots having their axes in the plane of the record sheet.

Another object is to make a record with spots each of which is like a small bar magnet having its axis in the plane of the record sheet and in the direction of feed of the sheet.

Further and other objects and advantages will be apparent from the specification and claims, and from the accompanying drawings which illustrate what is now considered a preferred embodiment of the invention.

In the drawings:

Fig. 1 shows a soft iron backing plate 18 on the underside of which is a paramagnetic record sheet 20. Preferably, the record sheet is a special paper into which a magnetizable material such as Alnico is incorporated when the paper is made.

Figures 1, 2:
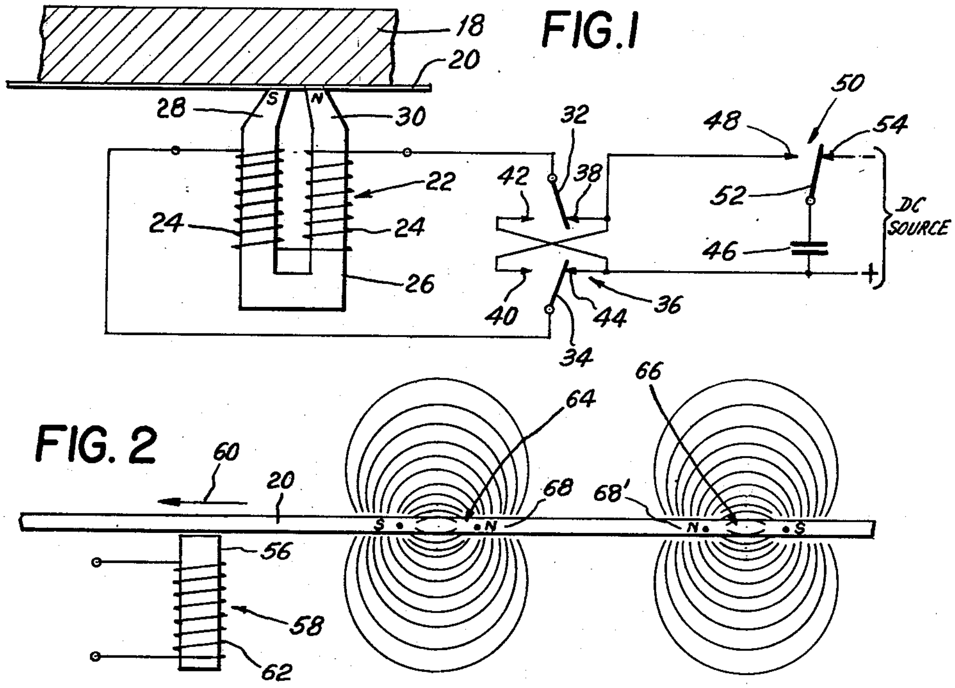
Fig. 1 is a diagram of apparatus for making a record in accordance with the principle of the invention.
Fig. 2 is a diagram illustrating the lines of force of the magnetic spots; this figure also shows a means (at the left) for sensing the record.

On the underside of sheet 20 is a horseshoe type magnet 22, preferably an electromagnet, having windings 24 on its core 26 such that, when current is passed through them, the poles 28 and 30 will be oppositely magnetized. The windings 24 of the magnet are connected to two blades 32, 34 of a reversing switch 36 having cross-connected contacts 38, 40 and 42, 44. The contacts 42 and 44 are connected to one side, (positive) of a source of direct current (not shown), and also to one plate of a condenser 46. The contacts 38 and 40 are connected to a normally open terminal 48 of a switch 50, the movable blade 52 of which is connected to the opposite side of the condenser 46 and normally rests against a contact 54 to the other side (negative) of the source of direct current. By throwing the switch blade 52 against contact 48, when the reversing switch is in the position shown in Fig. 1, the charge of the condenser 46 flows through the coils of the electromagnet in a direction to render the right hand pole 30 a north pole and the left hand pole 28 a south pole. This produces a bipolar magnetic spot on the record having a south pole at its right end and a north pole at its left end. The purpose of the backing plate is to concentrate the flux and thus produce a sharply defined spot.

After making a spot, in the manner described, sheet 20 can be moved, by any suitable means to bring a different area over the poles of the recording magnet. Also, the switch blade 52 is returned to contact 54 to recharge the condenser 46. Then if blades 32, 34 of the reversing switch 36 are thrown to the opposite contacts 40, 42 and the blade 52 is moved against the contact 48, the discharge from condenser 46 will pass through the coils of the electromagnet in the opposite direction, producing a magnetic spot of opposite polarization, that is with a north pole at its right end and a south pole at its left end.

Fig. 2 illustrates not only the lines of force produced in the spots produced as described above, but also (at the left) a method of sensing the spots. The record 20 is fed, by any suitable means (not shown), across one end of the core 56 of a sensing magnet 58, in the direction indicated by the arrow 60. The sensing magnet 58 has a coil 62 which can be connected to a device (not shown) which is to be responsive to the magnetic spots.

The record (in Fig. 2) is shown with two highly magnified bipolar magnetic spots 64 and 66, the north poles 68, 68' of which point in opposite directions. Each spot is like a small bar magnet, the axis of which lies in the plane of the record sheet and parallel to a common reference line, which in this case, is the direction of feed of the record sheet.

Figure 3:
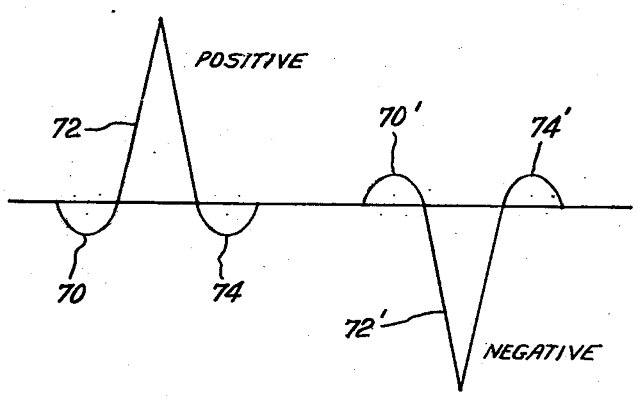
Fig. 3 is a diagram of the voltages induced in a sensing coil by the spots of opposite polarity.

When spots of the kind shown in Fig. 2 are sensed by a sensing magnet, voltages are induced in the coil of the sensing magnet as shown in Fig. 3. Each spot induces a voltage following a curve which begins with a small loop 70, 70' in one direction, then makes a sharp peak 72, 72' of much greater magnitude in the opposite direction, and finally passes through a small loop 74, 74' in the first direction. The two spots of Fig. 2 induce opposite voltages, due to the different orientation of their poles. Thus, if the peak 72 of the voltage induced by the first spot is regarded as positive, the peak 72' induced by the second spot is negative.

By providing a sensing means which distinguishes between positive and negative voltages, the entire alphabet and all numerals may be recorded with a code such as the following, which provides for numerals, alphabet, space and punch.

*Code combinations*

| Alphabet: | | Alphabet: | |
|---|---|---|---|
| A | *a*+ *d*+ | N | *a*+ *b*— *d*— |
| B | *b*+ *d*+ | O | *a*— *d*— |
| C | *a*+ *b*+ *d*+ | P | *b*— *d*— |
| D | *a*— *b*+ *d*+ | Q | *a*— *b*— *d*— |
| E | *a*+ *b*— *d*+ | R | *b*— *c*— *d*— |
| F | *a*— *d*+ | S | *b*+ *c*+ |
| G | *b*— *d*+ | T | *a*+ *b*+ *c*+ |
| H | *a*— *b*— *d*+ | U | *a*— *b*+ *c*+ |
| I | *b*— *c*— *d*+ | V | *a*+ *b*— *c*+ |
| J | *a*+ *d*— | W | *a*— *c*+ |
| K | *b*+ *d*— | X | *b*— *c*+ |
| L | *a*+ *b*+ *d*— | Y | *a*— *b*— *c*+ |
| M | *a*— *b*+ *d*— | Z | *a*+ *c*+ |

*Code combinations*—Continued

| | | | |
|---|---|---|---|
| SPACE | *a*+ *c*− | PUNCH | *b*+ *c*− |
| Numerals: | | Numerals: | |
| 1 | *a*+ | 6 | *a*− |
| 2 | *b*+ | 7 | *b*− |
| 3 | *a*+ *b*+ | 8 | *a*− *b*− |
| 4 | *a*− *b*+ | 9 | *b*− *c*− |
| 5 | *a*+ *b*− | 0 | *c*+ |

Figure 4:
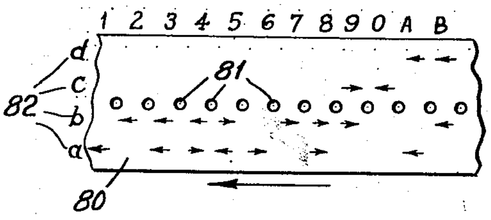
Fig. 4 illustrates a portion of a 4-position code type of magnetic spot tape record embodying the invention.

A portion of such a record (in tape form) is illustrated in Fig. 4, in which the magnetic spots indicate all the numerals, and two letters of the alphabet. The spots are bar magnets and are illustrated as arrows, those giving positive reactions pointing to the left, and those giving negative reactions pointing to the right.

The tape is designated 80, and sprocket holes 81 are provided along the center of the tape. Recording positions *a*, *b*, *c* and *d* are indicated at 82.

Figure 5:
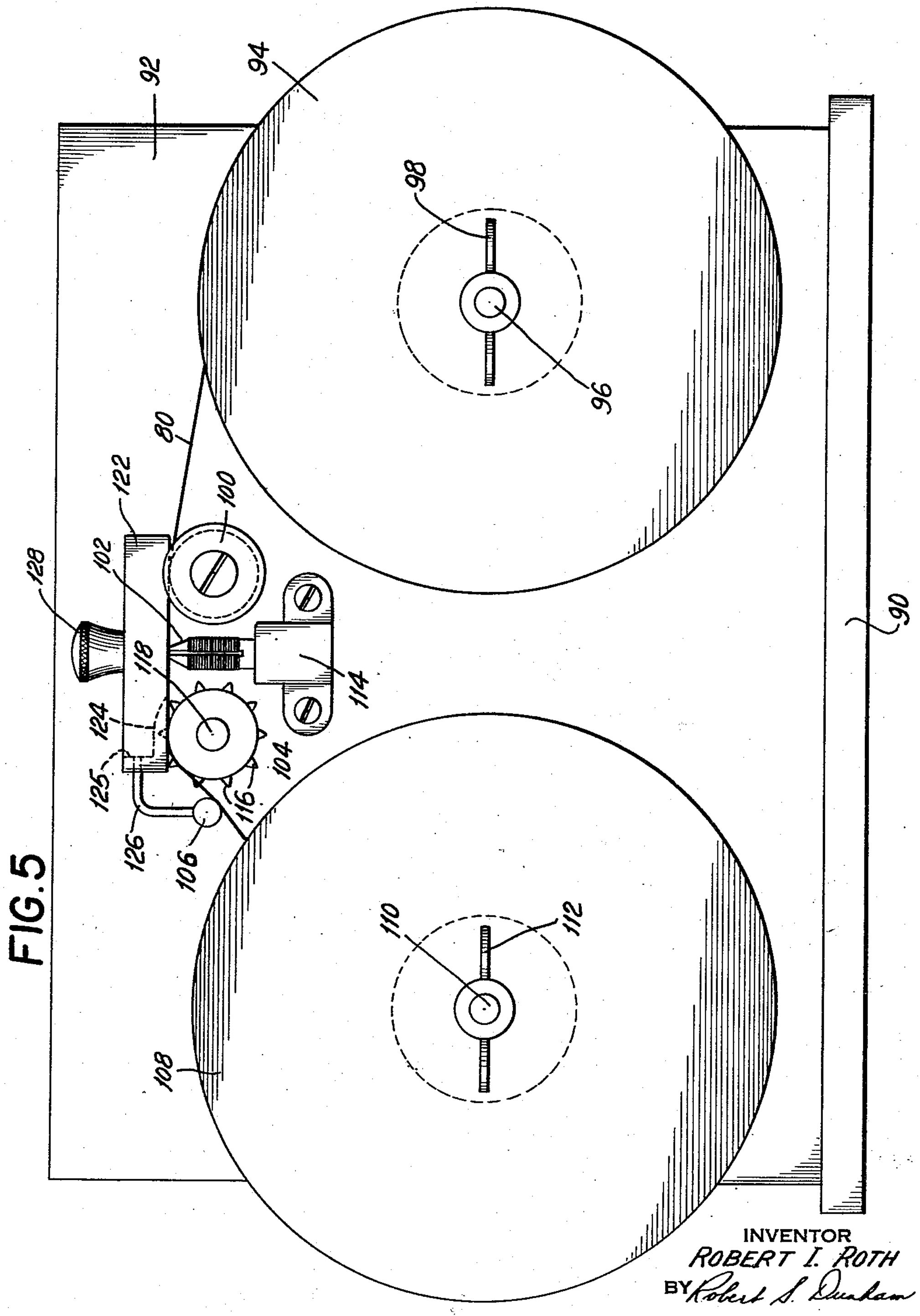
Fig. 5 is a front view of a machine for making a code record.
Figure 6:
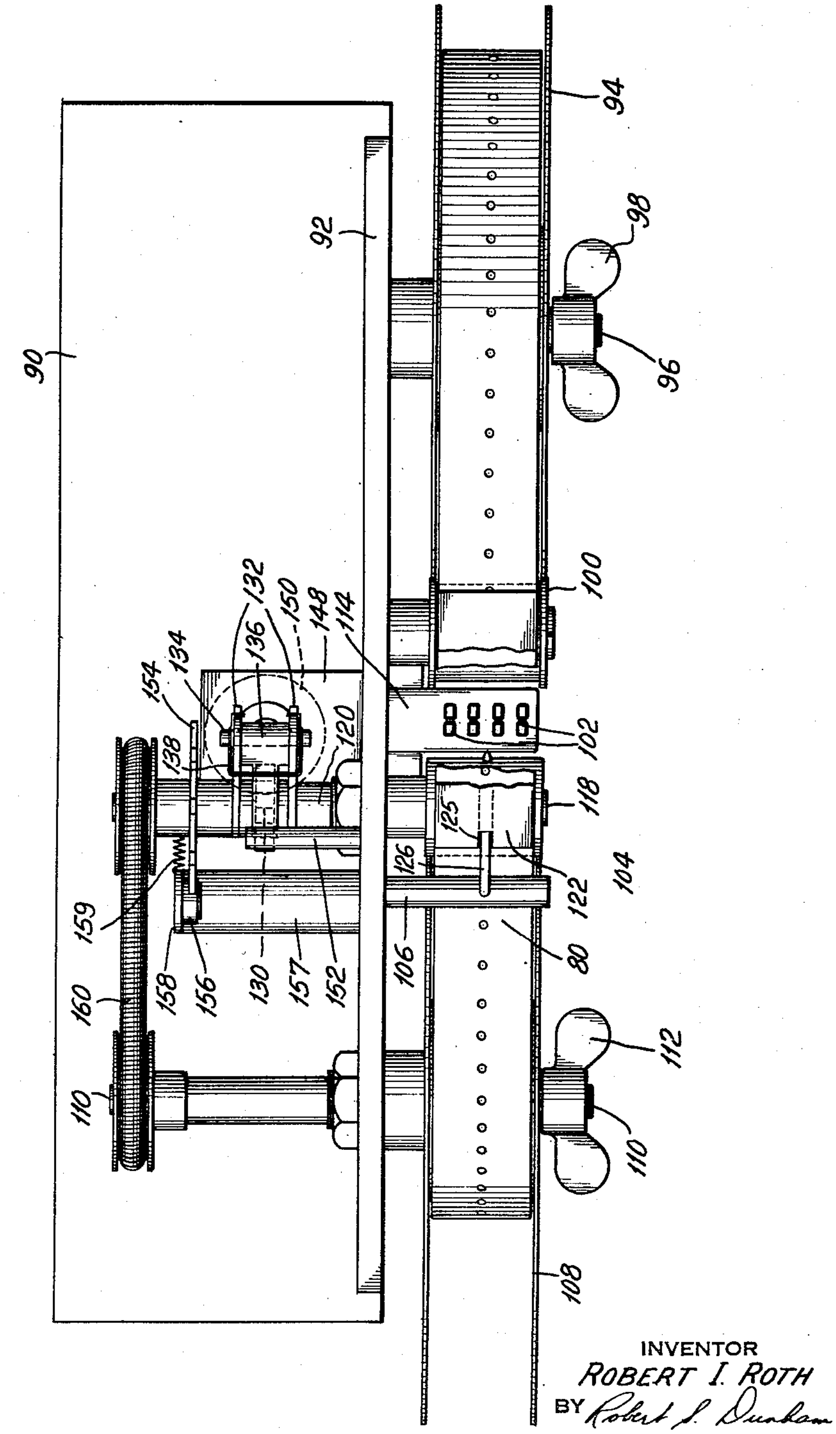
Fig. 6 is a top view of Fig. 5.

Referring to Figs. 5 and 6, the recording machine is built upon a base 90 on which a vertical plate 92 is erected. The unmagnetized tape is wound on a spool 94 which is rotatable on a stud 96 on which it is held by wing nut 98. The tape 80 is led from spool 94 over the idler pulley 100, over four recording magnets 102, (one magnet below each of the code positions *a, b, c, d*) then over sprocket 104, under stud 106 and onto the wind-up spool 108. Spool 108 is held on its shaft 110 by a key (not shown) and by the wing nut 112. Magnets 102 are supported by a bracket 114 on plate 92. Sprocket 104 is provided with teeth 116 and is fast on shaft 118 which is journaled in the bearing 120 (Fig. 6). A soft iron backing plate 122 rests on tape 80 as shown. The plate is provided with a cut away portion 124 in order to clear the sprocket teeth, and a notch 125 (Fig. 6) which accommodates the end of a bent rod 126 fastened to stud 106, fast in plate 92. Rod 126 prevents the backing plate 122 from moving with the tape as the tape is drawn underneath it. A knob 128 is provided so that the backing plate 122 can be easily grasped and removed.

Shaft 118 (Figs. 6, 7) has on it a ratchet 130. On either side of the ratchet is a loosely mounted plate 132. A pin 134 joins the two plates 132, and loosely mounted on this pin is the pawl 136. This pawl is held against ratchet 130 by a torsion spring 138. Another pin 140 extends between plates 132 and to this pin is pivoted the link 142. This link is pivoted at its lower end to the solenoid plunger 144 which is normally held in its upward position by spring 146 bearing against the frame 148 of the solenoid 150. Frame 148 is attached to vertical plate 92. Plunger 144 is limited in its upward travel by the pawl 136 coming in contact with a stud 152 fastened to frame 92. A detent disc 154 is also fast on shaft 118 and cooperates with a detent roller 156 mounted in an arm 158. Arm 158 is pivoted to the frame 92 at 157 and is urged to the right by spring 159. A spring belt 160 connects shaft 118 and 110 over suitable pulleys and provides the drive for the take-up spool 108.

Figure 7:
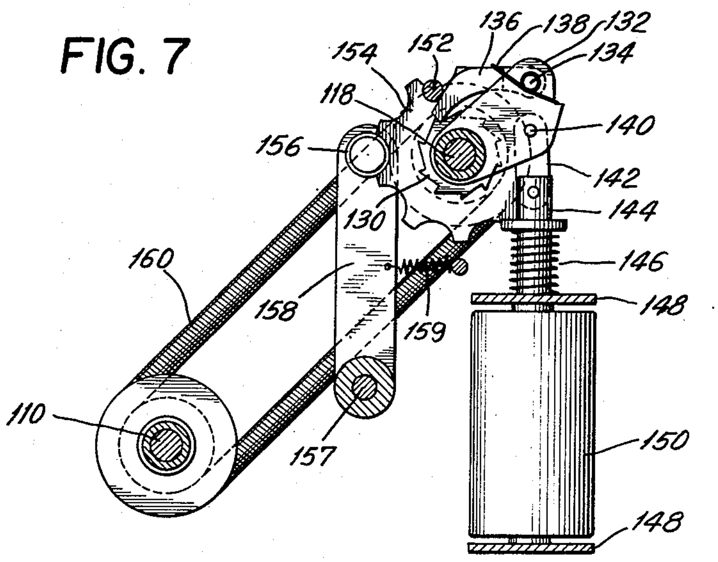
Fig. 7 is an enlarged view showing the solenoid and details of the ratchet mechanism.

Upon energization and subsequent deenergization of solenoid 150, ratchet 130 will be rotated one tooth counterclockwise as viewed in Fig. 7. This will cause sprocket 104 to be rotated one tooth and the tape 80 (Fig. 4) to be fed that same amount.

Figure 9:
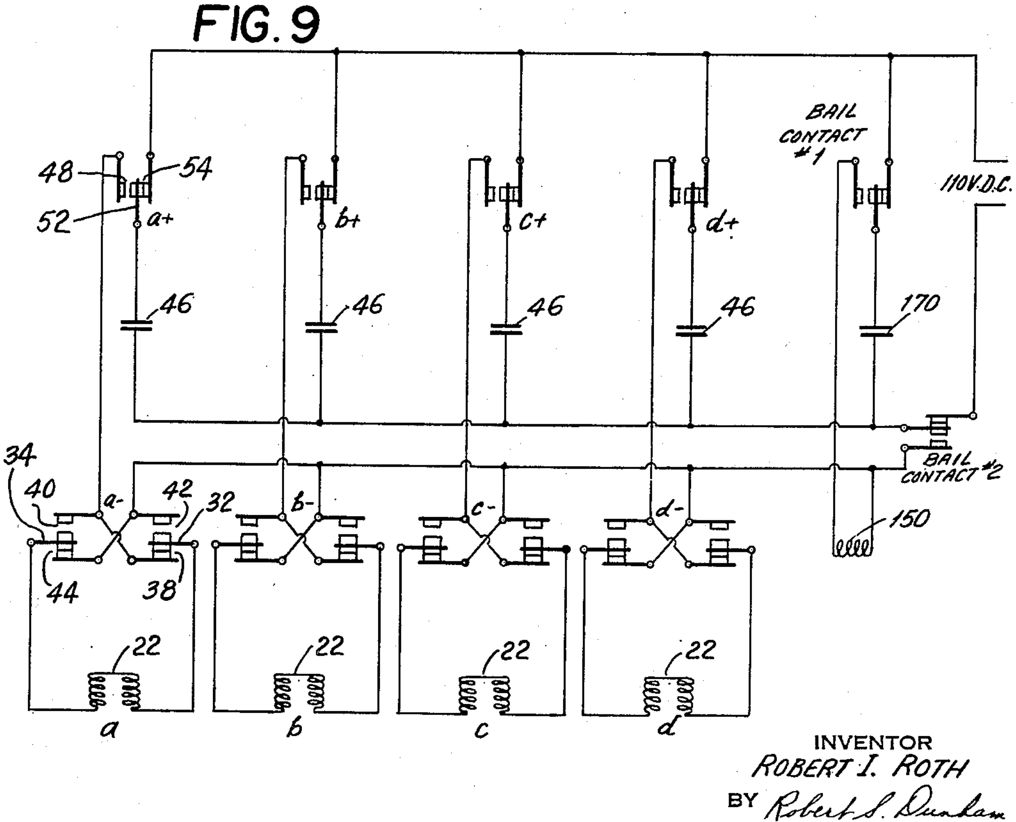
Fig. 9 is a wiring diagram including all the condensers indicated diagrammatically in Fig. 1.
Figure 8:
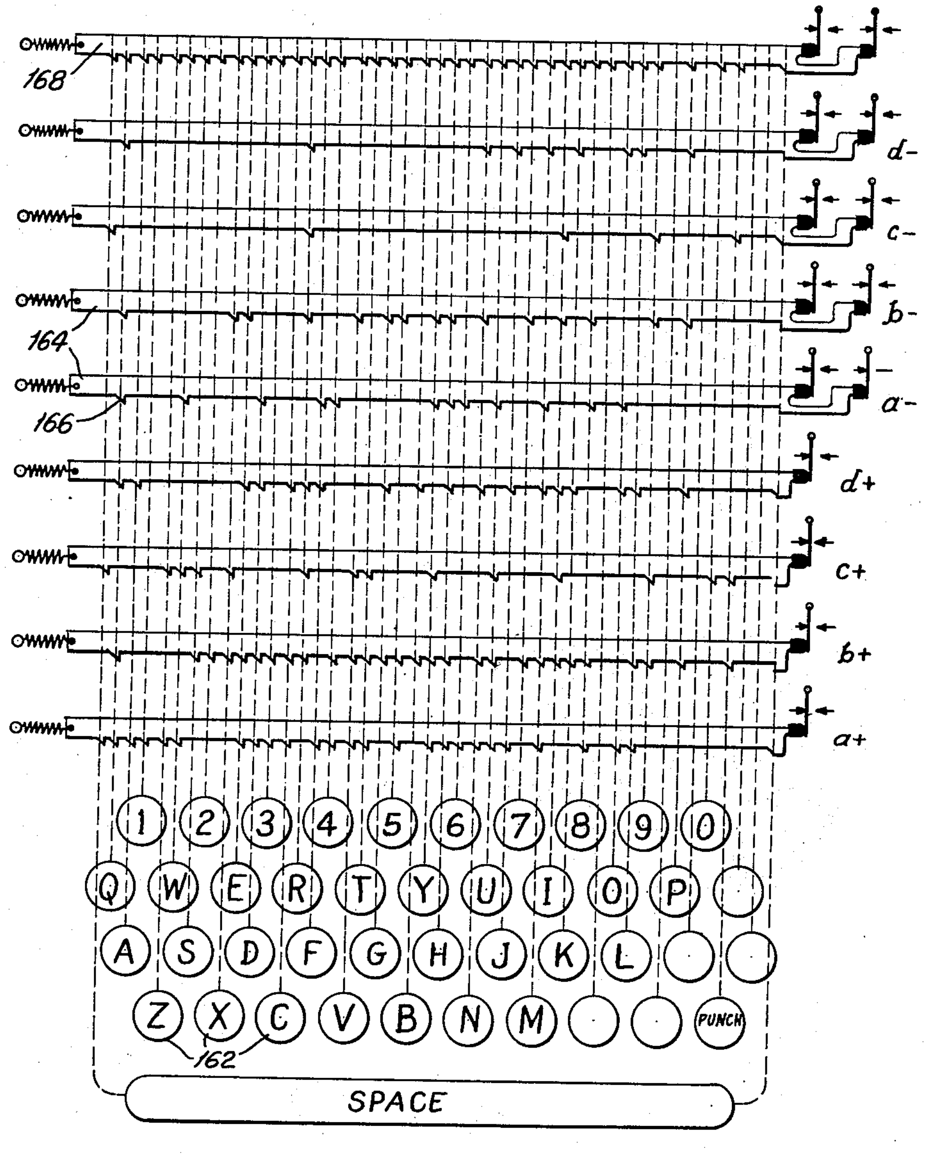
Fig. 8 is a diagram of a keyboard permutation bar arrangement.

In order to record the characters whose coded combinations are shown above, a keyboard and permutation unit is needed. This is shown diagrammatically in Fig. 8, and is of the type illustrated in Noll Patent No. 2,116,731. Depression of a key 162 can cause one or more of the permutation bars 164 to be moved to the right according to the arrangement of the cam faces 166 on the bars 164. A common permutation bar 168, shown at the top of Fig. 8, is actuated when any key is depressed. This common bar 168 controls the bail contacts #1 and #2 (Figs. 8 and 9). The contacts shown on Fig. 8 are also shown on the wiring diagram Fig. 9. Referring to Fig. 1 and Fig. 9, there are four condensers 46, one for each recording magnet 22. Another condenser 170 is provided to energize the tape solenoid.

In operation, the operator depresses keys to transfer the selected contacts according to the coded combination. Those contacts are adjusted to close before the closing of bail contacts #1 and #2. Bail contact #1 then closes and bail contact #2 closes slightly thereafter. The closure of bail contact #2 allows the selected condensers to discharge and thus make the recordings on the tape. Condenser 170 discharges through the tape solenoid 150 thus energizing it, and upon subsequent deenergization the tape will be advanced to its next position, as described.

It is to be understood that the invention is not limited to the specific embodiment herein illustrated and described but may be used in other ways without departure from its spirit as defined by the following claims.

What is claimed is:

1. In a device for making a bipolar magnetic control record, a recording zone, means for feeding a record web containing magnetizable material through said recording zone, a horseshoe magnet disposed in said recording zone with the legs thereof disposed in alignment with the direction of web motion through said zone, means for selectively conditioning said magnet for reversing the polarity thereof, and means for selectively energizing said magnet when said web feeding mechanism is at rest for producing on a control record in said recording zone discrete bipolar magnetic spots with the north poles thereof pointing in either of two opposite directions.

2. In a device for making a bipolar magnetic control record, a recording zone, means for feeding a record web containing magnetizable material through said recording zone, a horseshoe magnet disposed in said recording zone with the legs thereof disposed in alignment with the direction of web motion through said zone, an energizing circuit for said magnet including a coil surrounding each leg thereof, means for selectively reversing the direction of current flow through said coils, and means for selectively energizing said magnet by providing a closed circuit for a direct current through the coils thereof when said web feeding mechanism is at rest for producing on a control record in said recording zone discrete bipolar magnetic spots with the north poles thereof pointing in either of two opposite directions.

3. In a device for making a bipolar magnetic control record, a recording zone, means for feeding a record web containing magnetizable material through said recording zone, a horseshoe magnet disposed in said recording zone with the legs thereof disposed in alignment with the direction of web motion through said zone, an energizing circuit for said magnet including a coil surrounding each leg thereof, a reversing switch in said energizing circuit for selectively conditioning said magnet for reversing the polarity thereof, and means for selectively energizing said magnet by providing a closed circuit for a direct current through the coils thereof when said web feeding mechanism is at rest for producing on a control record in said recording zone discrete bipolar magnetic spots with the north poles thereof pointing in either of two opposite directions.

References Cited in the file of this patent

UNITED STATES PATENTS

| Number | Name | Date |
|---|---|---|
| 2,359,617 | Bryce | Oct. 3, 1944 |
| 2,363,336 | Keeler | Nov. 21, 1944 |
| 2,436,829 | Roth | Mar. 2, 1948 |
| 2,522,463 | Potts | Sept. 12, 1950 |